United States Patent
Groh et al.

(10) Patent No.: US 6,773,498 B1
(45) Date of Patent: Aug. 10, 2004

(54) BRIGHT PRECIOUS METALS PREPARATION FOR BAKING IN AT HIGH TEMPERATURES AND USES THEREOF FOR PRODUCING DECORATIVE BRIGHT PRECIOUS METAL ELEMENTS

(75) Inventors: Hans Groh, Wolfersheim (DE); Lutz Poth, Rossdorf (DE); Peter Lang, Linsengericht (DE)

(73) Assignee: Ferro GmbH, Frankfurt (DE)

( * ) Notice: Subject to any disclaimer, the term of this patent is extended or adjusted under 35 U.S.C. 154(b) by 145 days.

(21) Appl. No.: 10/048,375

(22) PCT Filed: Jul. 29, 2000

(86) PCT No.: PCT/EP00/07351

§ 371 (c)(1),
(2), (4) Date: May 8, 2002

(87) PCT Pub. No.: WO01/16053

PCT Pub. Date: Mar. 8, 2001

(30) Foreign Application Priority Data

Aug. 28, 1999 (DE) .......................................... 199 41 020

(51) Int. Cl.⁷ ................................................ C09D 1/00
(52) U.S. Cl. .............................. 106/287.18; 106/286.2; 106/286.3
(58) Field of Search ......................... 106/287.18, 286.2, 106/286.3

(56) References Cited

U.S. PATENT DOCUMENTS

| | | | | |
|---|---|---|---|---|
| 3,216,834 A | | 11/1965 | Fitch | |
| 3,266,912 A | * | 8/1966 | Murphy | 65/33.4 |
| 3,345,199 A | * | 10/1967 | Fitch | 427/229 |
| 3,718,488 A | | 2/1973 | Trofimenko et al. | |
| 4,262,040 A | * | 4/1981 | Russo | 427/229 |
| 4,418,099 A | * | 11/1983 | Cuevas et al. | 427/229 |
| 5,401,535 A | * | 3/1995 | Bishop | 427/229 |
| 5,545,452 A | * | 8/1996 | Schulz et al. | 428/41.7 |

FOREIGN PATENT DOCUMENTS

| | | |
|---|---|---|
| DE | 4122131 C1 | 7/1992 |
| DE | 19915937 A1 | 10/1999 |

OTHER PUBLICATIONS

Derwent abstract of DE 19915937, Oct. 1999.*

Derwent abstract of DE3809541, Aug. 1989.*

* cited by examiner

*Primary Examiner*—Helene Klemanski
(74) *Attorney, Agent, or Firm*—Rankin, Hill, Porter & Clark LLP

(57) ABSTRACT

Bright noble metal preparations for the production of bright noble metal decoration contain at least one noble metal compound and at least one non-noble metal as flux dissolved in a carrier medium. Preparations according to the invention, which are stoved at 1050 to 1300° C., contain as flux at least one cobalt compound in a quantity of 0.3 to 1.0 wt. %, calculated as CoO, and a chromium compound in a quantity of 0.2 to 0.7 wt. %, calculated as $Cr_2O_3$. The ratio by weight of $Cr_2O_3$ to CoO is in the range from 1.0–2.3.

9 Claims, No Drawings

BRIGHT PRECIOUS METALS PREPARATION FOR BAKING IN AT HIGH TEMPERATURES AND USES THEREOF FOR PRODUCING DECORATIVE BRIGHT PRECIOUS METAL ELEMENTS

DESCRIPTION

This invention relates to a bright noble metal preparation, in particular a bright gold preparation, for high temperature firing, wherein the preparation applied onto a siliceous article is stoved at 1050 to 1300 ° C., i.e. above the melting point of gold. The resultant decoration is a bright noble metal film. The invention also provides a process for the production of a bright noble metal decoration, in particular a bright gold decoration, on a siliceous support.

Bright noble metal preparations substantially consist of one or more noble metal compound and flux compounds soluble in a liquid carrier medium. The most important noble metal compounds are those of gold, for which reason such preparations are also frequently known as bright gold preparations. The noble metal compounds are conventionally present in the form of organic compounds, in which the noble metal is attached to an organic skeleton via a sulfur or oxygen bridge. Since these materials frequently comprise mixtures of substances, they are known as noble metal resinates and noble metal sulforesinates. The flux compounds comprise in particular resinates and sulforesinates of elements of main groups three to five and of subgroups three to eight of the periodic system. The carrier media usually comprise a combination of at least one solvent and a binder. The liquid carrier medium may be purely organic, organic/aqueous or substantially purely aqueous. The organic media often comprise those based on hydrocarbons, alcohols and sulfur-containing compounds, such as sulfurised terpene hydrocarbons and terpene alcohols as well as sulfurised natural resins. The composition of bright noble metal preparations and the use thereof for the production of bright to matt films containing noble metals on a siliceous substrate, wherein production of the decoration includes firing at a temperature in the range from approx. 500 to 1400° C., are known from numerous documents.

DE-PS 24 35 859 discloses a coating composition containing gold for stoving on ceramic articles at temperatures of 1100 to 1400° C., which composition contains, apart from a gold preparation, 3 to 40 wt. % of one or more non-noble metals and/or one or more additional noble metals having a melting point of above 1400° C. in powder form and up to 10 wt. % of an coupling oxide or glass flux. The coating composition, which is better described as a burnished gold preparation, may additionally contain organic and/or inorganic gold compounds in addition to metallic gold. The substantial constituents of the preparation, namely elemental gold, the non-noble metals and the coupling oxides or glass fluxes, are insoluble in the organic carrier medium. The gold content of such coating compositions is distinctly above that which is conventional for bright gold preparations and decoration of elevated brightness is not obtained. The non-noble metal component comprises Mg, Si, Ti, Mn, Fe, Ni, Zn, Zr and/or Sb. The coupling oxides comprise compounds of B, Al, V, Cr, Sn, Bi and Ce. Cobalt or cobalt compounds are not mentioned as a constituent of the non-noble metal components and coupling oxides.

DE-PS 22 08 915 discloses a burnished and powdered gold preparation which contains a stabilising addition from the group Cassius gold purple, tin oxide, iron oxide and aluminium in order to increase stoving resistance and bismuth borate as flux. The preparation, with which only matt decoration is obtained, contains no compounds of chromium and/or cobalt.

DE-PS 14 21 865 discloses a process for the production of a vitreous ceramic article coated with a noble metal film, wherein the bright noble metal preparation to be used contains a soluble organic noble metal compound and 0.25 to 10 mol per mol of noble metal of a soluble flux and an organic carrier for the noble metal compound and the flux. Stoving is performed at at least 900° C. This document mentions numerous flux-producing non-noble metals, including aluminium, boron, bismuth, chromium, cobalt, indium, silicon, tantalum, titanium and zirconium. The preparation of Example 7, which contains a gold mercaptide and a titanate does not give rise to a gold coloured film of elevated brightness, but instead to a dark grey film. The preparations which contain a gold mercaptide, rhodium resinate, bismuth resinate and chromium resinate optionally together with a tantalum alkoxide (c.f. columns 9 and 10 of DE-AS 14 21 865) also generally give rise to matt films and only in one case (composition d) was a bright, but dark coloured film obtained.

The preparation of Example 1 of DE-AS 14 21 865 based on a gold mercaptide, niobium alcohol and cobalt resinate comprises a typical burnished gold preparation which yields a silk matt, but not bright gold film only after polishing with a glass fibre brush. While the document does indeed teach that the flux-producing element or elements must be present in a certain quantity relative to the noble metal, there is no indication that a combination of cobalt and chromium as the flux-producing elements gives rise to unusual effects.

It is known from DE-PS 38 09 541 that bright noble metal preparations consisting of at least one organo-noble metal compound, an organic carrier and a flux of organic metal compounds may be stoved at 1250° C. and be used for the production of dishwasher-resistant bright noble metal decoration on crockery of siliceous materials, if the flux contains organic silicon compounds having 3 and/or 4 hydrolysable groups on the silicon atom in a quantity of 0.1 to 4 mol of Si per mol of noble metal. The presence of a high concentration of an organosilicon noble metal compound results during firing in the formation of a transparent vitreous layer on the noble metal film, which layer is responsible for the elevated mechanical strength of the decoration, but the decoration itself is very dark and frequently has a reddish or greenish discolouration and thus has only limited applications. The document gives no indication of additionally using a cobalt compound as a flux constituent. While bright decorative layers are indeed still obtained if the content of organosilicon compounds in the flux is reduced below the value according to the claims, these decorative layers adhere poorly to the ceramic substrate.

According to DE-PS 40 03 796, microwave-resistant noble metal decoration, in particular bright gold decoration, stovable at 1180 to 1230° C. is obtained if a bright gold preparation is used, the flux of which contains an organic nickel compound. The flux preferably additionally contains a soluble organic compound of silicon, aluminium, chromium and bismuth. Such preparations do not, however, meet the quality requirements for bright gold decoration.

DE-PS 37 21 000 also discloses a noble metal preparation for the production of microwave-resistant decoration, which preparation has a noble metal content of 60 to 90 wt. % and a non-noble metal content of 10 to 40 wt. %, in each case relative to the total metal content of the preparation. Non-noble metals, used in the form of a resinate and/or sulforesinate, which are mentioned include: Al, Sb, Ba, Bi, B, Ca, Ce, Cr, Co, Si, Ge, Ta, Sn, Ti, Zn and Zr. The gold preparation according to the Examples of this document is stoved at 800° C., the burnished gold preparation at 1250° C. There is no indication that the bright gold preparation may be stoved at a temperature above the melting point of gold. The document also provides no indication that it is convenient to use cobalt and chromium together in a certain quantity as flux in order to obtain a bright noble metal preparation for high temperature firing.

Noble metal preparations according to U.S. Pat. No. 4,418,099 which contain organometallic compounds of elements of groups 4a and b, 5a and b and 6b of the periodic system as flux component and additionally contain a non-metallic lustre pigment, such as mica, give rise under conventional firing conditions (450 to 900° C.) to silk matt noble metal decoration of the burnished gold type. This document gives no indication of how the preparation could be stoved at a higher temperature by using both a chromium compound and a cobalt compound as flux components.

The object of the present invention is accordingly to provide a bright noble metal preparation, in particular a bright gold preparation, which may be stoved at a temperature above the melting point of gold or above the melting point of an alloy containing gold as the principal component and so yields bright metallic decoration with the natural colour of the noble metal or noble metal alloy.

It has been found that this object may surprisingly be achieved by the flux of the noble metal preparation containing both a chromium compound and a cobalt compound in a specified ratio relative to each other.

The invention accordingly provides a bright noble metal preparation for the production of bright noble metal decoration stoved at 1050 to 1300° C. comprising one or more organic noble metal compounds in a quantity corresponding to 6 to 16 wt. % of noble metals, a flux of at least two non-noble metal compounds and an organic or organic/aqueous or substantially aqueous carrier medium, in which the noble metal and non-noble metal compounds are substantially dissolved, which preparation is characterised in that the flux contains a chromium compound in a quantity of 0.3 to 1.0 wt. %, calculated as $Cr_2O_3$, and a cobalt compound in a quantity of 0.2 to 0.7 wt. %, calculated as CoO, wherein the ratio by weight of $Cr_2O_3$ to CoO is in the range from 1.0–2.3.

The subordinate claims relate to preferred embodiments. The presence of the combination according to the invention of flux constituents prevents the molten noble metal, which substantially comprises gold or gold alloys, from coalescing into large droplets on the surface of the substrate to be decorated. Any diffusion of oxides from the glaze onto the surface of the noble metal film is simultaneously largely prevented. When required, it is generally sufficient in order completely to reveal the bright film, simply to wipe the stoved decoration with, for example, a moist cloth or to polish it gently, for example with a glass fibre brush.

The bright noble metal preparations contain one or more soluble compounds of noble metals from the range gold, silver, ruthenium, rhodium, palladium, osmium, iridium and platinum. The principal component of the preparations preferably comprises one or more compounds of gold together with one or more soluble compounds of the elements silver, rhodium, palladium and platinum in order to modify colour and properties. The noble metal content of the preparation is in the range from 6 to 16 wt. % of noble metals, relative to the preparation, preferably in the range from 8 to 15 wt. % and particularly preferably in the range from 9 to 12 wt. %.

The noble metal compounds contained in the bright noble metal preparations according to the invention comprise organic compounds which are soluble in the organic, organic/aqueous or substantially aqueous medium which is present. The organic noble metal compounds in particular comprise those in which the noble metal is attached to an organic skeleton via a sulfur or oxygen bridge. Said compounds in particular comprise so-called sulforesinates, which are obtained from the reaction of a gold compound with a sulfurised resinous compound, as well as thioesters and in particular thiolates based on aliphatic, cycloaliphatic and aromatic mercaptans. In the event that the noble metal preparation contains an aqueous or organic/aqueous medium, the organic noble metal compound additionally comprises solubilising groups from the range —COOH—, —$SO_3H$, —OH, —$CONH_2$, —$NH_2$ and —OP(O) (OH)$_2$. Organic noble metal compounds soluble in an organic carrier medium are generally known in specialist circles and reference is made by way of example to the documents cited above. Gold compounds soluble in an aqueous/organic carrier medium are known from EP-B 0 514 073 and EP-B 0 668 265.

Apart from the organic noble metal compounds, the preparation according to the invention contains at least two or more organic or/and inorganic non-noble metal compounds which are soluble in the preparation and form the corresponding oxide of the element under the firing conditions. The organic or inorganic residue of these non-noble metal compounds may be selected at will, provided that the compound is homogeneously soluble in the selected carrier medium and the compound may be decomposed without leaving a residue on firing to form the oxide of the element. In a similar manner as with the noble metal compounds, these compounds may comprise low molecular weight alkoxides and thiolates as well as so-called resinates and sulforesinates. Some flux elements, including cobalt and chromium, may also be used in the form of salts of aliphatic or aromatic carboxylic acids, such as ethylhexanoates or octanoates, or complexes with aliphatic diketones, such as for example pentanedionates or mixtures of these compounds. Inorganic fluxes may be used in preparations with an aqueous or aqueous/organic medium. It is essential to the invention that the flux contains both a cobalt compound and additionally a chromium compound.

The bright noble metal preparation contains at least one chromium compound in a quantity of 0.3 to 1 wt. %, preferably of 0.4 to 0.9 wt. %, in each case calculated as $Cr_2O_3$, and at least one cobalt compound in a quantity of 0.2 to 0.7 wt. %, preferably of 0.25 to 0.6 wt. %, in each case calculated as CoO. It is essential to the invention that the compounds of chromium and cobalt are present in a ratio by weight of $Cr_2O_3$ to CoO in a range from 1.0–2.3, preferably in a range from 1.4–1.8. Organic Co and Cr compounds are preferably used in preparations which are anhydrous or contain little water. The significance of the presence of both flux constituents and the ratio thereof may be observed from the practical Examples.

In addition to the cobalt compound and chromium compound required in the flux according to the invention, the flux may contain one or more further organic and/or inorganic non-noble metal compounds of metals of groups 3a and b, 4a and b, 5a and b, 6b, 7b, 8b, 1b and 2b. Preferred bright noble metal preparations contain as additional flux component one or more compounds from the range boron and aluminium; indium; scandium, yttrium, lanthanum, cerium; silicon, germanium and tin; titanium and zirconium; bismuth; vanadium, niobium and tantalum; iron and copper. Although rhodium counts as a noble metal, rhodium compounds do not have the action of a flux.

According to a particularly preferred embodiment, apart from a chromium compound and a cobalt compound, the flux additionally contains an organic titanium-compound, for example an alkoxytitanate. The titanium compound is preferably present in the bright noble metal preparation in a quantity of 0.4 to 1.5 wt. %, calculated as $TiO_2$.

Additionally using an organic indium compound in a quantity of 0 to 0.8 wt. %, calculated as $In_2O_3$, has also proved advantageous. According to another embodiment of the noble metal preparation according to the invention, said preparation contains an organic boron compound and/or organic silicon compounds as additional flux components. Using the latter-stated flux constituents permits the formation of a thin transparent glass layer on the noble metal layer, so increasing the mechanical strength of the decoration.

Although the bright noble metal preparation according to the invention contains the chromium compound and cobalt compound in a total quantity of at least 0.5 wt. %, calculated as $Cr_2O_3$+CoO, it is advantageous to increase the flux content further, such that the total quantity of fluxes amounts preferably to at least 1 to 5 wt. %, preferably 1.5 to 3.5 wt. %, calculated as the sum of non-noble metal oxides. Bright noble metal preparations according to the invention, the flux of which also contains a titanium compound, preferably contain the latter in a quantity of 0.5 to 2 wt. %, calculated as $TiO_2$. Preferably used organic titanium compounds are titanium alkoxides, in particular tetraalkoxytitanates and Ti salts of carboxylic acids.

Carrier media which may be considered are those as are known from prior bright gold preparations comprising an organic or organic/aqueous medium. The carrier medium conventionally comprises both an organic binder and an organic, organic/aqueous or a substantially purely aqueous solvent. The composition of the carrier medium and the quantity to be used thereof are selected such that the organic noble metal compounds and organic non-noble metal compounds form a clear solution therein and that the preparation exhibits a viscosity suitable for the selected mode of application and good film properties of the dried, but as yet unstoved, film. The organic noble metal compounds and organic non-noble metal compounds preferably still form a homogeneous system or a solution after drying. The binder or binders present should be dissolved as the clearest possible solution in the solvent or solvent mixture present. Known binders for bright noble metal preparations are polyacrylic and polymethacrylic resins, polyvinylpyrrolidone, cellulose ethers, such as hydroxyalkyl-, alkoxy- and carboxyalkylcellulose, polyamides,-polyalkylene glycols, such as polyethylene glycol, polyesters, polyacrylamides, polyvinyl acetate, polyvinyl alcohol, alkyd resins, polyamines, polyurethane resins, hydrocarbon resins together with natural resins and sulfurised natural resins, such as sulfurised dammar resin. Bright noble metal preparations according to the invention, which contain water-soluble bright noble metal compounds and non-noble metal compounds, conveniently contain as binder component a resin or resin mixture which additionally contains water-solubilising groups.

Bright noble metal preparations comprising a substantially organic carrier medium generally contain 10 to 40 wt. % of one or more organic solvents. Aliphatic, cycloaliphatic and aromatic hydrocarbons are suitable, in particular alkylated aromatics and terpene hydrocarbons, ketones, alcohols and ethers; essential oils are also very suitable.

Maleic acid, modified rosin and rosin-modified phenolic resins are further effective binder constituents. Waxes from the range of fatty alcohols, fatty amides, polyolefin waxes and polyalkylene glycols are also suitable as binders. Non-aqueous bright noble metal preparations conventionally contain an organic carrier medium containing one or more binders and one or more organic solvents in a total quantity of approx. 20 to 60 wt. %, relative to the preparation.

The bright noble metal preparations may be produced in conventional manner by homogenising the organic noble metal compounds, flux compounds and the carrier medium containing the solvent and/or binder. Production may additionally comprise a sulfurisation step, wherein unsaturated binders and/or solvents and optionally noble metal compounds are crosslinked by sulfur bridges. Application and firing conditions are stated below.

The bright noble metal preparations may be applied onto the substrate to be decorated in per se known manner, such as by direct or indirect printing, by brushing or banding machines. Wet film thickness is generally 10 to 40 μm. After drying, the decoration is stoved at 1050 to 1300° C. The favourable firing range for bright gold preparations is 1100 to 1230° C. A pink-coloured oxide layer is increasingly formed on the decoration at above this firing temperature. At below 1100° C., the preparation still fires to yield a bright finish, but the resultant colour tone becomes darker as the temperature falls. The optical appearance of the noble metal decoration produced in this manner is bright without polishing. In individual cases, the decorative layer is covered by a thin deposit which may straightforwardly be removed (by wiping with a moist cloth or a glass fibre brush), so resulting in a brilliant bright finish. The scratch resistance, chemical resistance and dishwasher resistance of the decoration produced according to the invention match those of decoration obtainable under standard firing conditions (450 to 900° C.).

The bright noble metal preparations according to the invention not only produce a beautiful noble metal colour, elevated brightness and good adhesion, but it is also possible to stove the bright noble metal preparation at the same time as in-glaze colorants, such that only one decoration firing is required instead of two. The bright noble metal preparations according to the invention may also be used in burnished gold preparations.

The following Examples and Comparative Examples illustrate the invention.

EXAMPLES AND COMPARATIVE EXAMPLES

Preparations of the following composition were produced in the conventional manner and applied by brush onto hard porcelain. Firing was performed by raising the temperature to 1200° C. in approx. 60 minutes and then cooling within 60 minutes.

Gold sulforesinates having an Au content of approx. 30 or 40 wt. % were used. The flux compound containing Cr was chromium hexanoate, corresponding to 10 wt. % of $Cr_2O_3$; the compound containing Co was an ethylhexanoate comprising 10 wt. % CoO; the compound containing Ti was oligomeric butyl titanate comprising 17 wt. % $TiO_2$; the compound containing In was an acetylacetonate comprising 7.66 wt. % $In_2O_3$; the compound containing Si was trimethoxydecyloxysilane comprising 20 wt. % $SiO_2$; the compound containing B was a boric acid ester of methylcyclohexanol comprising 10% $B_2O_3$. The preparation based on $Fe_2O_3$ comprised a benzoate, in the case of CuO an ethylhexanoate/naphthenate, in the case of $SnO_2$ a benzoate/naphthenate, in the case of CaO and $MoO_3$ a methylhexanoate, in the case of $ZrO_2$ a zirconate, in the case of $RuO_2$ a sulforesinate, in each case having the stated metal oxide content.

Example 1

Bright gold preparation:

| Composition Substance (content, wt. %) | Quantity (wt. %) | Au and oxides (wt. %) |
|---|---|---|
| Gold sulforesinate (40.1% Au) | 27.43 | 11.0% Au |
| Butyl titanate (17% $TiO_2$) | 3.3 | 0.56% $TiO_2$ |
| Indium preparation (7.66% $In_2O_3$) | 2.6 | 0.20% $In_2O_3$ |
| Chromium hexanoate (10% $Cr_2O_3$) | 5.6 | 0.56% $Cr_2O_3$ |
| Cobalt preparation (10% CoO) | 3.2 | 0.32% CoO |
| Boron preparation (10% $B_2O_3$) | 2.4 | 0.24% $B_2O_3$ |
| $(MeO)_3Si$—$C_{10}H_{11}$ (20% $SiO_2$) | 2.0 | 0.40% $SiO_2$ |
| Limonene carrier | 26.74 | |
| Syrian asphalt | 26.74 | |

Ratio by weight: $Cr_2O_3$/CoO=1.75

Ratio by weight: flux oxides/Au=0.20

The decoration stoved at 1200° C. was bright, exhibited a golden yellow colour tone and good adhesion.

Example 2

| Substance (content, wt. %) | Quantity (wt. %) | Au and oxides (wt. %) |
|---|---|---|
| Gold sulforesinate (29.86% Au) | 29.48 | 8.8% Au |
| Butyl titanate (17%) | 2.84 | 0.48% $TiO_2$ |
| Indium preparation (7.66%) | 5.2 | 0.32% $In_2O_3$ |
| Chromium hexanoate (10%) | 5.6 | 0.56% $Cr_2O_3$ |
| Cobalt preparation (10%) | 4.0 | 0.4% CoO |
| Boron preparation (10%) | 1.6 | 0.16% $B_2O_3$ |
| SD thick oil (sulfurised dammar resin) | 25.64 | |
| ST balsam (sulfurised oil of turpentine) | 25.64 | |

Ratio by weight: $Cr_2O_3$/CoO=1.70

Ratio by weight: flux oxides/Au=0.217

The decoration stoved at 1200° C. was of a golden colour and bright.

Comparative Examples VB 1 to VB 6

Comparative Examples VB 1 to VB 4 clearly demonstrate the significance of adding an organocobalt compound. These preparations are identical to Example 1 with regard to composition and the total quantity of flux, but another non-noble metal compound was added instead of the organocobalt compound. VB 5 and VB 6 show that a Co compound alone, i.e. without a Cr compound, does not result in good preparations.

Comparative Example 1

| Substance | Quantity (wt. %) | Au and oxides (wt. %) |
|---|---|---|
| Gold sulforesinate (40.11% Au) | 27.43 | 11.0% Au |
| Butyl titanate | 3.3 | 0.56% $TiO_2$ |
| Indium preparation | 4.0 | 0.14% $In_2O_3$ |
| Chromium hexanoate | 5.6 | 0.56% $Cr_2O_3$ |
| Iron preparation (17% $Fe_2O_3$) | 1.75 | 0.30% $Fe_2O_3$ |
| Boron preparation | 2.4 | 0.24% $B_2O_3$ |
| Trimethoxydecylsilane | 2.0 | 0.4% $SiO_2$ |
| Limonene | 26.76 | |
| Syrian asphalt | 26.76 | |

Comparative Example 2

| Substance | Quantity (wt. %) | Au and oxides (wt. %) |
|---|---|---|
| Gold sulforesinate (40.11% Au) | 27.43 | 11.0% Au |
| Butyl titanate (17% $TiO_2$) | 3.3 | 0.56% $TiO_2$ |
| Indium preparation (3.47% $In_2O_3$) | 4.0 | 0.14% $In_2O_3$ |
| Chromium hexanoate (10% $Cr_2O_3$) | 5.6 | 0.56% $Cr_2O_3$ |
| Copper preparation (10% CuO) | 3.0 | 0.30% CuO |
| Boron preparation (10% $B_2O_3$) | 2.4 | 0.24% $B_2O_3$ |
| Trimethoxydecylsilane | 2.0 | 0.4% $SiO_2$ |
| Limonene | 26.14 | |
| Syrian asphalt | 26.14 | |

Comparative Example 3

| Substance | Quantity (wt. %) | Au and oxides (wt. %) |
|---|---|---|
| Gold sulforesinate (40.11% Au) | 27.43 | 11.0% Au |
| Butyl titanate (17% $TiO_2$) | 3.3 | 0.56% $TiO_2$ |
| Indium preparation (3.47% $In_2O_3$) | 4.0 | 0.14% $In_2O_3$ |
| Chromium hexanoate (10% $Cr_2O_3$) | 5.6 | 0.56% $Cr_2O_3$ |
| Tin preparation (10% SnO) | 3.0 | 0.30% SnO |
| Boron preparation (10% $B_2O_3$) | 2.4 | 0.24% $B_2O_3$ |
| Trimethoxydecylsilane | 2.0 | 0.4% $SiO_2$ |
| Limonene | 26.14 | |
| Syrian asphalt | 26.14 | |

Comparative Example 4

| Substance | Quantity (wt. %) | Au and oxides (wt. %) |
|---|---|---|
| Gold sulforesinate (40.11% Au) | 27.43 | 11.0% Au |
| Butyl titanate (17% $TiO_2$) | 3.3 | 0.56% $TiO_2$ |
| Indium preparation (3.47% $In_2O_3$) | 4.0 | 0.14% $In_2O_3$ |
| Chromium hexanoate (10% $Cr_2O_3$) | 5.6 | 0.56% $Cr_2O_3$ |
| Calcium methylhexanoate (16.31% CaO) | 1.85 | 0.30% SnO |

-continued

| Substance | Quantity (wt. %) | Au and oxides (wt. %) |
|---|---|---|
| Boron preparation (10% $B_2O_3$) | 2.4 | 0.24% $B_2O_3$ |
| Trimethoxydecylsilane | 2.0 | 0.4% $SiO_2$ |
| Limonene | 26.71 | |
| Syrian asphalt | 26.71 | |

The preparations of Comparative Examples VB 1 to VB 4 were applied onto a porcelain plate with a brush and fired at 1200° C. In all the Examples, the decoration produced on the plate was matt and coated with a pink or ochre coloured oxide deposit. While careful polishing with a glass fibre brush did indeed reveal a gold layer under the oxide layer, the gold layer exhibited only very slight adhesion to the substrate and was largely removed during the polishing operation. The preparations of Comparative Examples VB 1 to VB 4 are thus not usable as preparations for decorating ceramic articles.

Comparative Example 5

VB 5 is identical to Example 1 with regard to the composition of the non-noble metal components, but no organochromium compound was added.

| Substance | Quantity (wt. %) | Au and oxides (wt. %) |
|---|---|---|
| Gold sulforesinate (40.11% Au) | 27.43 | 11.0% Au |
| Butyl titanate (17% $TiO_2$) | 3.3 | 0.56% $TiO_2$ |
| Indium preparation (7.66% $In_2O_3$) | 2.6 | 0.2% $In_2O_3$ |
| Cobalt preparation (10% CoO) | 3.2 | 0.32% CoO |
| Boron preparation (10% $B_2O_3$) | 2.4 | 0.24% $B_2O_3$ |
| Trimethoxydecylsilane | 2.0 | 0.4% $SiO_2$ |
| Limonene | 19.69 | |
| Syrian asphalt | 39.38 | |

Total non-noble metal oxides/Au=0.156

Firing this preparation on a ceramic substrate at 1200°C. results in gold decoration which is covered by a strongly pink coloured oxide layer and exhibits only slight adhesion to the substrate.

As has already been explained above, however, adding an organocobalt compound as the non-noble metal component is not the sole prerequisite for obtaining a usable gold decoration. Rather, the cobalt compound must be used together with an organochromium compound.

Comparative Example VB 6

In Comparative Example preparation VB 6, the organochromium compound was replaced by a compound of molybdenum, which is of the homologous group.

| Substance | Quantity (wt. %) | Au and oxides (wt. %) |
|---|---|---|
| Gold sulforesinate (29.86% Au) | 33.5 | 10.0% Au |
| Butyl titanate (17% $TiO_2$) | 2.9 | 0.50% $TiO_2$ |
| Indium preparation (7.66% $In_2O_3$) | 3.9 | 0.3% $In_2O_3$ |
| Cobalt preparation (10% CoO) | 5.0 | 0.5% CoO |
| Boron preparation (10% $B_2O_3$) | 3.0 | 0.3% $B_2O_3$ |
| Molybdenum preparation (10% $Mo_2O_3$) | 7.0 | 0.7% $Mo_2O_3$ |
| Eucalyptus oil | 44.7 | |

Total non-noble metal oxides/Au=0.23

Firing this preparation on a ceramic substrate at 1200° C. results in a pink coloured oxide layer without a bright gold finish.

Examples B3 to B10 and Comparative Examples VB7 to VB9

The following table shows further compositions according to the invention and not according to the invention and properties of the decoration after firing at 1200° C. Conventional preparations were used. The table contains the quantity of gold and flux, respectively calculated as Au or non-noble metal oxide.

TABLE (values in wt. %)

| No. | Au | $TiO_2$ | $In_2O_3$ | $Cr_2O_3$ | CoO | $B_2O_3$ | $SiO_2$ | Other oxides | $Cr_2O_3$/CoO | Decoration properties |
|---|---|---|---|---|---|---|---|---|---|---|
| B 3 | 11 | 0.8 | 0.8 | 0.7 | 0.3 | | | | 2.33 | good, somewhat reddish |
| VB 7 | 11 | 0.6 | 0.6 | 0.5 | 0.7 | | | | 0.71 | pink, oxide deposit |
| B 4 | 11 | 0.6 | 0.6 | 0.7 | 0.5 | | | | 1.4 | good |
| VB 8 | 11 | 0.6 | 0.6 | 1.3 | 0.5 | | | | 2.6 | matt, much flaking |
| B 5 | 8.8 | 0.48 | | 0.56 | 0.4 | 0.48 | | | 1.4 | good |
| VB 9 | 17 | 0.5 | 0.25 | 0.7 | 0.4 | 0.25 | 0.5 | | 1.75 | poor, matt |
| B 6 | 10 | 0.5 | 0.3 | 0.8 | 0.5 | 0.3 | 0.5 | | 1.6 | good |
| B 7 | 11 | 0.5 | | 0.8 | 0.6 | 0.3 | | 0.6 $RuO_2$ | 1.33 | good |
| B 8 | 15 | 0.5 | 0.25 | 0.7 | 0.4 | 0.3 | 0.5 | | 1.75 | good |
| B 9 | 11 | 0.28 | 0.14 | 0.56 | 0.32 | 0.24 | 0.4 | 0.28 $ZrO_2$ | 1.75 | good |
| B 10 | 11 | 1.5 | 0.14 | 0.56 | 0.32 | 0.24 | 0.4 | | 1.75 | good |

What is claimed is:

1. Bright noble metal preparation for the production of bright noble metal decoration stoved at 1050° to 1300° C. comprising one or more organic noble metal compounds in a quantity corresponding to 6 to 16 wt. % of noble metals, a flux of at least two non-noble metal compounds and an organic or organic/aqueous or substantially aqueous carrier medium, in which the noble metal and non-noble metal compounds are substantially dissolved, wherein the flux contains at least one chromium compound in a quantity of 0.3 to 1.0 wt. %, calculated as $Cr_2O_3$, and a cobalt compound in a quantity of 0.2 to 0.7 wt. % calculated as CoO, wherein the ratio by weight of $Cr_2O_3$ to CoO is in the range of 1.0 to 2.3.

2. Bright noble metal preparation according to claim 1, wherein said preparation includes at least one organic gold compound in a quantity corresponding to 8 to 15 wt. % gold, an organic chromium compound in a quantity of 0.4 to 0.9 wt. %, calculated as $Cr_2O_3$, and an organic cobalt compound in a quantity of 0.25 to 0.6 wt. %, calculated as CoO.

3. Bright noble metal preparation according to claim 1, wherein said preparation includes at least one chromium compound and at least one cobalt compound in a quantity corresponding to a weight ratio of $Cr_2O_3$ to CoO in the range from 1.4 to 1.8.

4. Bright noble metal preparation according to claim 1, wherein said flux additionally contains at least one organic non-noble metal compound selected from the range of compounds consisting of the elements boron, aluminum; indium, scandium, yttrium, lanthanum, cerium; silicon, germanium, tin; titanium, zirconium; bismuth; vanadium, niobium, tantalum; iron and copper.

5. Bright noble metal preparation according to claim 1, wherein said flux additionally contains an organic titanium compound in a quantity of 0.4 to 1.5 wt. %, calculated as $TiO_2$, and an organic indium compound in a quantity of 0 to 0.8 wt. %, calculated as $In_2O_3$.

6. Bright noble metal preparation according to claim 1, wherein said preparation contains organic non-noble metal compounds in a total quantity of 1.5 to 3.5 wt. %, calculated as the total of non-noble metal oxides.

7. Process for the production of a bright noble metal decoration on a siliceous substrate comprising application of a bright noble metal preparation onto at least parts of the surface of a siliceous substrate and stoving, wherein a bright noble metal preparation according to claim 1 is applied and stoved at a temperature of 1050° to 1300° C.

8. Bright noble metal preparation according to claim 1, wherein the carrier medium substantially consists of organic constituents.

9. Process according to claim 7, wherein the bright noble metal preparation is stoved at 1100° to 1230° C.

* * * * *